United States Patent [19]

Volz

[11] Patent Number: 5,096,267
[45] Date of Patent: Mar. 17, 1992

[54] VACUUM BRAKE FORCE BOOSTER FOR A SLIP-CONTROLLED BRAKE SYSTEM

[75] Inventor: Peter Volz, Darmstadt, Fed. Rep. of Germany

[73] Assignee: Alfred Teves GmbH, Frankfurt am Main, Fed. Rep. of Germany

[21] Appl. No.: 542,867

[22] Filed: Jun. 22, 1990

[30] Foreign Application Priority Data

Jun. 24, 1989 [DE] Fed. Rep. of Germany ....... 3920766

[51] Int. Cl.$^5$ .................. B60T 8/32; B60T 8/44; B60T 13/52; B60T 13/68
[52] U.S. Cl. .................. 303/113 TB; 60/545; 91/369.1; 91/376 R; 91/459; 303/114 PN; 303/119 SV
[58] Field of Search .................. 303/114, 119, 110, 93, 303/113 TR, 113 TB, 114 PN, 115 VM, 119 SV, 119 R; 188/356, 357; 91/369.1, 369.2, 376 R, 459, 361; 60/545, 538; 180/197

[56] References Cited

U.S. PATENT DOCUMENTS

| 3,653,725 | 4/1972 | Hayes et al. | 303/114 |
| 3,795,426 | 3/1974 | Sisson | 303/114 |
| 4,620,750 | 11/1986 | Leiber | 303/114 R |
| 4,659,153 | 4/1987 | Kleih | 303/114 PN |
| 4,702,531 | 10/1987 | Kircher et al. | 303/114 PN |
| 4,819,996 | 4/1989 | Belart et al. | 303/114 |
| 4,900,101 | 2/1990 | Becker et al. | 303/114 X |
| 4,966,420 | 10/1990 | Schiel et al. | 303/114 |

FOREIGN PATENT DOCUMENTS

| 3317629 | 11/1984 | Fed. Rep. of Germany . |
| 2136899 | 9/1984 | United Kingdom . |
| 2226611 | 7/1990 | United Kingdom . |
| 2234026 | 1/1991 | United Kingdom ......... 303/114 PN |

Primary Examiner—Douglas C. Butler
Attorney, Agent, or Firm—Robert P. Seitter; J. Gordon Lewis

[57] ABSTRACT

A brake valve for a vacuum brake force booster, wherein the valve body (33) is movably located on the pedal piston (32). The valve body, through two springs (35, 39) is held in a central position in which the brake pedal and pedal piston may move the valve body between booster deactivated and deactivated positions. Two electromagnets (37, 40) are provided which draw the valve body (33) both in the actuating direction and against the actuating direction. In this manner, the valve (17) can be actuated independently of the pedal force, to either release or apply braking pressure as for automatic antislip or traction control.

8 Claims, 2 Drawing Sheets

VACUUM BRAKE FORCE BOOSTER FOR A SLIP-CONTROLLED BRAKE SYSTEM

BACKGROUND OF THE INVENTION

The present invention relates to a vacuum brake force booster for a slip-controlled brake system wherein by applying a control force to a valve piston the brake valve of the vacuum brake force booster is activated without applying pedal force, thereby to modulate pressure in the brake circuits.

A vacuum brake force booster of the type to which the present invention is directed and provides an improvement is disclosed, for example, in German patent application DE OS 33 17 629. The vacuum brake force booster is part of a brake system comprising the vacuum brake force booster itself, a master brake cylinder actuated thereby and being in communication, through blockable brake conduits, with the wheel brake cylinders. In addition, it comprises a master valve to exchange the connection to the atmosphere and the vacuum connection of the vacuum brake force booster.

With the brake applied, the system works in the usual manner. Through the brake valve, air is admitted to the booster chamber of the vacuum brake force booster, thereby forcing the booster wall toward the master brake cylinder and generating a hydraulic pressure in the brake system causing the brakes to be applied.

An excessive pressure in the brake system results in wheel locking which can be detected by means of sensors. An electronic analyzer receiving the sensor signals provides a control signal to the master valve causing the vacuum connection and the connection to the atmosphere of the vacuum brake force booster to be interchanged. As a consequence, the vacuum brake force booster no longer will operate in concurrence with but rather against the pedal force, thereby reducing the pressure in the brake system. A system of the aforedescribed type now involves two disadvantages: firstly, provision of a complex master valve is required rendering conditional compliance with a variety of criteria, to wit, on the one hand, quick operation to insure a rapid pressure decrease within the brake system and, on the other hand, provision for large opening cross-sections is required because substantial flow volume of air will have to be accommodated within the short switching time available.

Another disadvantage resides in that the brake system cannot be readily employed for the traction slip control. A traction slip control is intended to preclude the driven wheels from racing in view of an excessive engine torque not adapted to the frictional relationship between tire and road. For this reason, irrespective of the brake actuation, a brake pressure is intended to be admitted to the brake system.

Another brake system operating on the same system as the brake system according to DE-OS 33 17 629, is known. The afore-system equally exhibits an external master valve. Moreover, the vacuum brake force booster is of a highly complex design as it comprises a total of three chambers.

DE-OS 32 40 680 discloses a brake system comprising a hydraulic brake force booster exhibiting a valve piston disposed in parallel to the booster piston to which can be applied not only the pedal force but also an electromagnetic force.

The object of the invention is to provide a vacuum brake force booster for a slip-controlled brake system, which is simple in design and eliminates the use of a master valve. Moreover, it is to enable the use of a traction slip control with a vacuum brake force booster.

SUMMARY OF THE INVENTION

This problem is solved by a vacuum brake booster having a brake valve body and pedal piston directly actuated by brake pedal force, the brake valve body moved from a booster deactivated position to a booster actuated position by advance of the brake pedal and pedal piston. The valve body is mounted to be moveable relative to the pedal, so that the valve body may be shifted independently when an additional force is controllably applied independently of the pedal force, during slip control operation. Thus, the valve body is not fixed to the pedal piston, as taught in known systems, but rather is movable relative thereto. As long as there is no need for slip control, a spring holds the valve body against a stop on the pedal piston.

To decrease the pressure in the brake system, a second electromagnet is provided, moving the valve body against the force of the spring, thereby switching the valve body into its deactivated position. Although a pedal force is effective, no boosting takes place through the vacuum brake force booster, thereby causing a pressure decrease in the master brake cylinder. The second electromagnet is, of course, arranged such that the valve body is moved against the actuating direction of the pedal piston.

This system can be further enhanced in that the valve body is floatingly mounted between two springs. A first electromagnet when energized draws the valve body, as previously explained, against the actuating direction or to a deactivating position of the pedal piston while the valve body, by the second electromagnet, is drawn in the actuating direction to an actuating position. Upon energization of the second electromagnet, the brake valve, hence, is actuated with no pedal force being applied. Consequently, irrespective of the pedal force, a pressure can develop within the master brake cylinder and, hence, a brake torque can be provided which is suitably employed for the compensation of driving torques.

It is readily apparent that the principle of the invention, causing additional forces to directly act on the valve body of the brake valve, is not only is realizable by means of electromagnets. Any other type of force generation advantageously can be utilized. However, when using electromagnets, it is advantageous to provide the same as well as the valve body and the sealing seats of the brake valve, in concentric relationship on the piston, thereby attaining a compact design, eliminating the need for substantially enlarging a standard-type vacuum pressure brake force booster.

BRIEF DESCRIPTION OF THE DRAWING

The invention will now be described in greater detail with reference to the following drawing in which.

DETAILED DESCRIPTION

Figure 1:
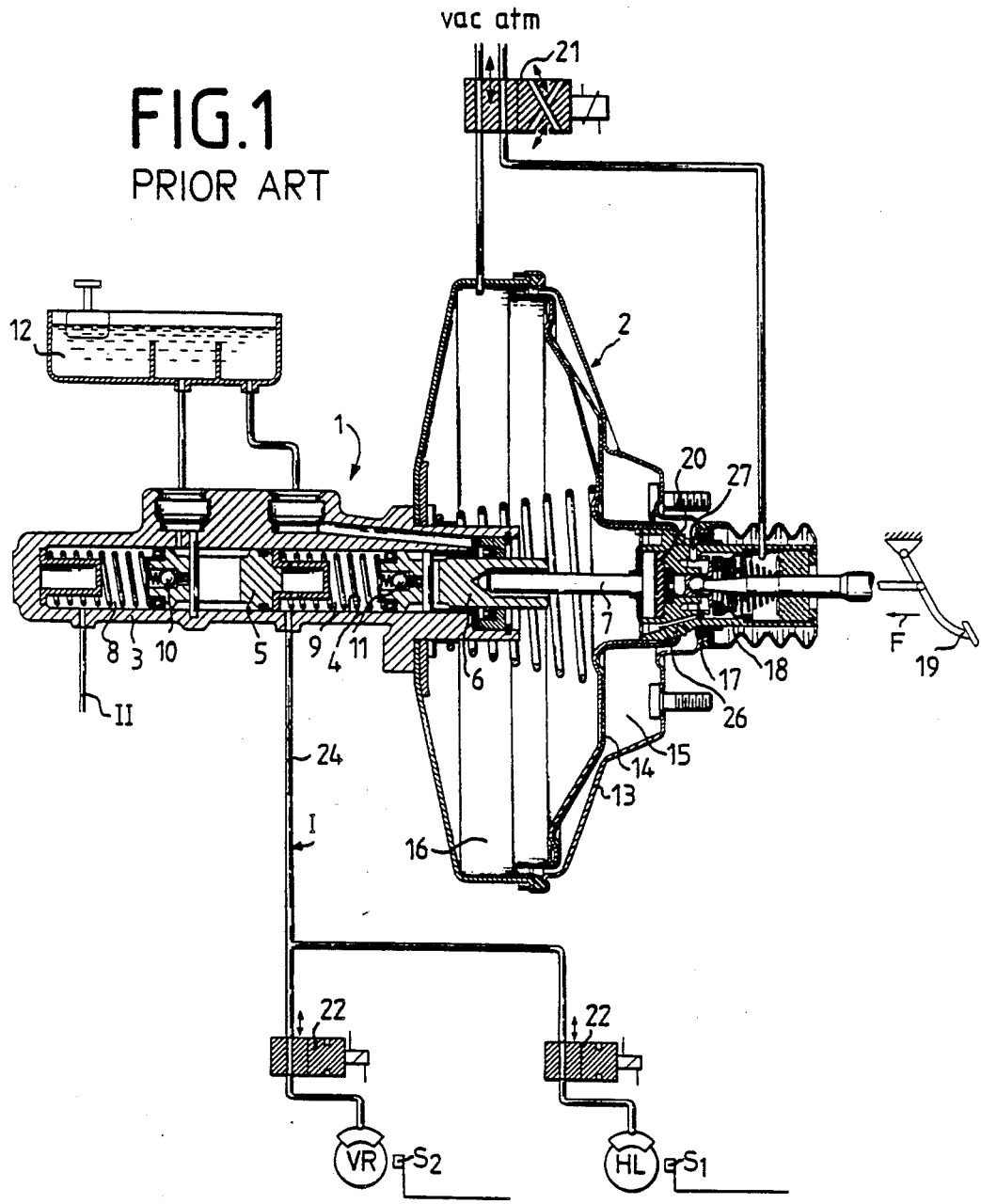
FIG. 1 is a sectional view of the components of a state-of-the-art system.

FIG. 1 shows the state-of-the-art brake system, comprising a master brake cylinder 1 and a vacuum brake force booster 2 coupled upstream of the master brake cylinder 1. The master brake cylinder 1 comprises an elongated housing 3 provided with a longitudinal bore 4 in which are sealingly guided a floating piston 5 and a push rod piston 6. The push rod piston 6, through a push rod 7, is actuated by a vacuum brake force booster 2. The two pistons 5 and 6, within bore 4, confine two working chambers 8 and 9 in communication with respectively one brake conduit I and II. Each of the pistons 5 and 6 includes a central valve 10, 11 through which the working chambers 8, 9 are in communication with a reservoir 12. In the basic position of pistons 5 and 6 as shown in FIG. 1 of the drawing, the central valves 10, 11 are opened, thereby establishing a pressure fluid connection of brake conduits I and II to reservoir 12. With the brake applied, pistons 5 and 6, according to the illustration of FIG. 1, are displaced to the left, thereby causing the central valves, 10, 11 to block and the brake conduits 1 and II to be hydraulically closed.

The vacuum brake force booster 2 is made up of a housing 2 formed of two housing cups, with a booster wall 14 hung, through a rolling diaphragm, into the housing, subdividing the same into two chambers. Located on the side of the booster wall 14 facing the master cylinder is the vacuum chamber 16 in communication with a vacuum source. Disposed on the other side of the booster wall 14 is the booster chamber 15 ventilated through a brake valve 17. The brake valve 17 is provided in a control housing 18 in communication with the booster wall 14, to protrude through the rear housing wall to the outside. The valve 17 is actuated by means of the pedal 19. In the basic position of the valve, the vacuum chamber 16 and the booster chamber 15 are interconnected such that the pressure of the vacuum source prevails in both chambers. Once the pedal 19 is actuated, the chambers are separated from one another and the booster chamber 15 is connected to the atmosphere, with air flowing into the booster chamber 15 moving the booster wall 14 toward the master brake cylinder. This movement, by means of push rod 7 supported through the reaction disc 20 on the control sleeve, is transmitted to the push rod piston 6.

The master valve 21 exhibits two switching positions. In the embodiment as shown, the vacuum chamber 16, as previously explained, is in communication with the vacuum source, while the booster chamber 15, upon actuation of the brake valve, can be connected to the atmosphere. Once the master valve 21 is switched, these two connections are interchanged.

In the system sown in FIG. 1, a brake circuit is made up of a brake conduit 24 and of the wheel brakes of the wheels of a diagonal. A diagonal is formed by the opposing wheels provided in diagonal relationship on the automotive vehicle. In the example shown, these are the right-hand front wheel (VR) and the left-hand rear wheel (HL). The rotating pattern of these wheels is monitored by sensors S1 and S2, with a blocking valve 22 being associated to each wheel brake. The other diagonal is associated to the brake circuit II.

FIG. 1 shows the basic position of the system. With the brake applied, the pedal force F supported by the servo force of the vacuum brake force booster, acts upon the master brake cylinder. In the event that one of the wheels tends to lock, the master valve 21 will re- switch, thereby causing air to flow into the vacuum chamber 16 and to displace the booster wall 14 away from the master brake cylinder. This will decrease the pressure in the master brake cylinder and in brake circuits in communication therewith, and will reduce the brake effect. The blocking valve 22 serve to decouple the wheel not tending to lock, from the brake conduit 24 in the pressure decreasing phase, so that the decreased pressure in the master brake cylinder will become effective only on the wheel tending to lock.

Figure 2:
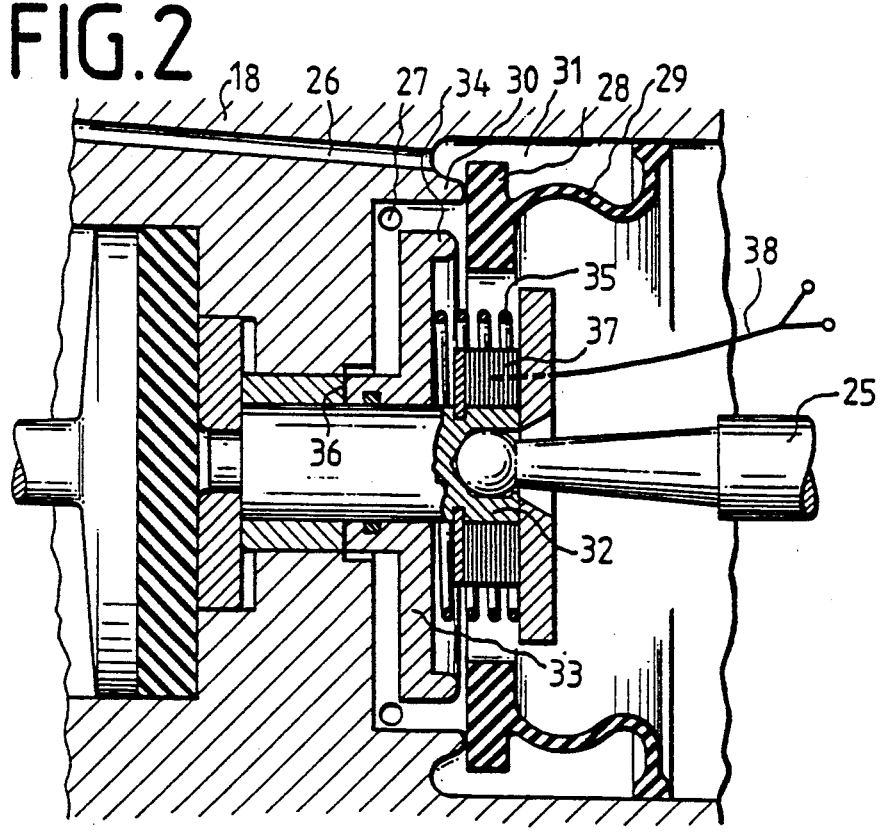
FIGS. 2 and 3 are sectional views of two preferred embodiments of a vacuum brake force booster in accordance with the present invention accommodating a brake valve.
Figure 3:
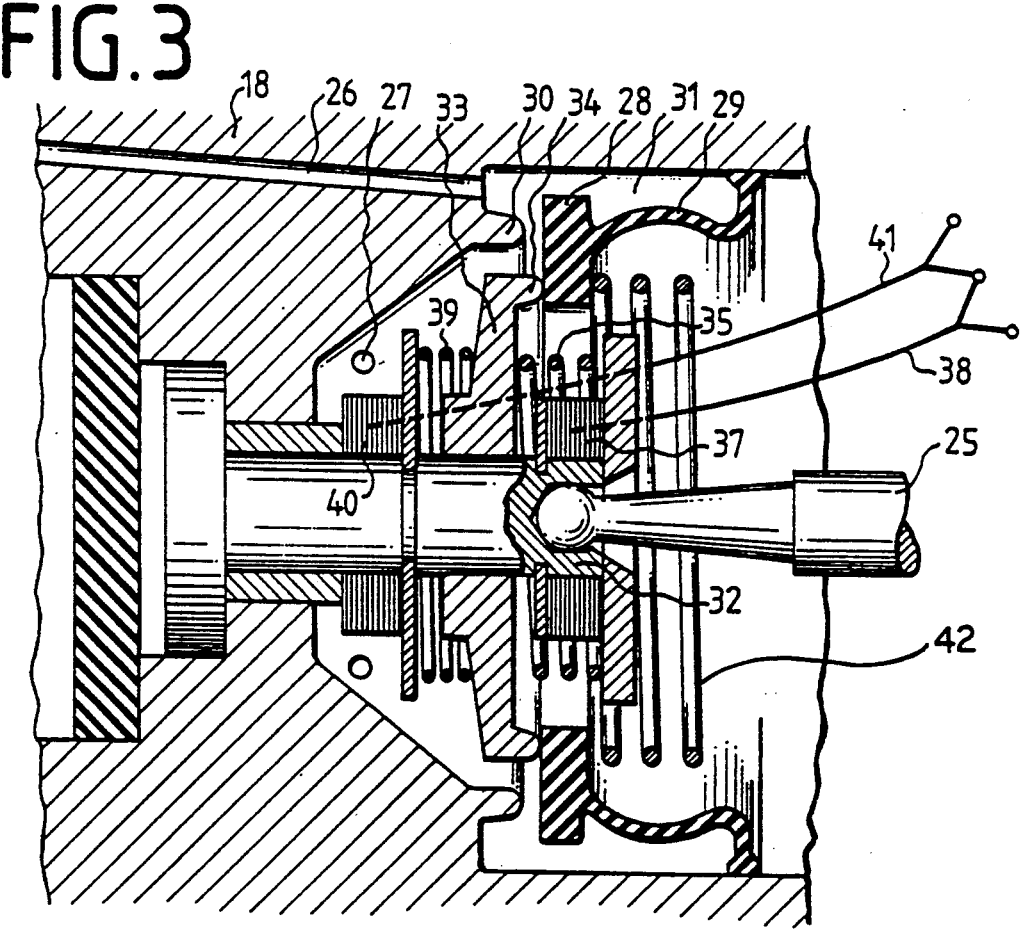

Reference will now be made to FIGS. 2 and 3 illustrating the present invention and respectively showing one control housing 18 with the brake valve located therein. These control sleeves can be integrated into the example system of FIG. 1 in which case the master valve 21 can be eliminated. The pedal rod 25 is supported on the pedal piston 32 which, in turn, may be placed in abutment with the push rod 7 through the reaction disc 20. The valve body 33 is slidingly disposed on the pedal piston 32. The valve body 33 is in the form of a disc, the central axis of which coincides with the central axis of the pedal piston 33. Located on the external rim of the disc is the inner sealing seat 34 formed as a circumferential edge. The outer sealing seat 30 formed as a circumferential edge on the control housing 18 takes a slightly more radially outward position. Both sealing seats can be placed in abutment with a valve disc 28 which, by means of a boot 29, is fixed to the control housing 18. Formed between the boot 29 and the control housing 18 is an annular chamber 31 which, through a passageway 26 (see also FIG. 1) is in communication with the vacuum chamber 16.

Another passageway 27 within the control housing 18 (also see FIG. 1) connects the chamber between the valve body 33 and the control housing 18 to the booster chamber 15. The valve body 33 in the prior art booster shown in which, according to FIG. 1 is fixed to the pedal piston 32, but according to the booster shown in FIGS. 2 and 3, is mounted to be relatively movable to the pedal piston 37. A spring 35 supported on the pedal piston 32, holds the valve body 33 against a stop 36 on the pedal piston 32. The action of the spring force is such that the valve body 33 is moved in the actuating direction, i.e., in a direction away from the valve disc 28 as the brake pedal 32 is advanced from its rest position. An electro-magnet 37 also arranged in concentric relation to the pedal piston 37 and having electrical lead wires 38, is operable to draw the valve body 33 against the force of the spring 35 toward the valve body 28.

The brake valve according to FIG. 2 operates as follows: FIG. 2 illustrates the actuated position with the brake pedal advanced. The valve disc 28 is in abutment with the outer sealing seat 30 so that the communication between the vacuum chamber 16 and the booster chamber 15, through passageway 26 and 27, respectively, is interrupted. The inner sealing seat 34 has been shifted by the brake pedal 35 acting through the spring 35 to be located spaced from the valve disc 28 so that air can flow past the sealing seat 34 into the passageway 27 to the booster chamber 15. The in-flowing air forces the booster plate 14 toward the master cylinder, generating an additional servo force acting, in addition to the pedal force, on the push rod piston 6. Once the electromagnet 37 is activated, the valve body 33 is moved against the force of the spring 35 in the opposite direction, i.e., against the actuating direction toward the valve disc 28. The sealing seat 34 is placed in abutment with the valve disc 28 thereby being equally caused to move to right as shown in FIG. 2. The movement will separate the outer sealing seat 30 from the valve disc 28 to establish a pressure fluid communication between the two chambers 15 and 16. The air is evacuated from the booster chamber 15 through the intake connection on the vacuum chamber 16, thereby reducing the servo force. The activation of the electromagnet 37 can take place if, for example, one of the wheels tends to lock requiring a decrease in the pressure in the brake circuits.

When releasing the brake, that is, when reducing the force on the pedal rod 25, the valve body 33 will move along with the pedal piston 32 according to FIG. 2 to the right, thereby equally placing the inner sealing seat 34 in abutment with the valve disc 28 and causing the outer sealing seat 30 to separate itself from the valve disc 28. In this manner, both chambers 15 and 16 are connected to the vacuum source.

The embodiment according to FIG. 3 constitutes an improvement over the embodiment according to FIG. 2. As opposed to FIG. 2, the valve body 33 is held floating between the first spring 35 and a second spring 39 rather than against a stop on the pedal piston 32. In addition to the first electromagnet 37, a second electromagnet 40 is also provided so that the valve body 33 is relatively movable on the pedal piston both in the actuating direction and in the opposite direction tending to deactivate the booster. FIG. 3 shows the booster deactivated position of the valve body 33, positioned to the right of the outer valve seat 30 so that a pressure fluid connection is established between the vacuum chamber 16 and the booster chamber 15 via passages 26, 27. Through actuation of the pedal rod 25, the valve body 33 is shifted in the leftward direction by the pedal piston 32 acting through the spring 35 to lift the sealing seat 34 of valve 33 off disc 28, and allowing disc 28 to seat on the outer seat 30 spring 42 assists in this seating movement of the embodiment of FIG. 2. Through activation of the first electromagnet 34, subsequently, the pressure in the brake circuits can, as previously described, be decreased by causing relative movement of the valve body 33 to again contact disc 28 as described above. The second electromagnet 40 when activated serves to draw (irrespective of the pedal position) the valve body 33 to the left i.e., in the actuating direction. If the second electromagnet 40, through the connecting cable 41, is, energized the valve body 33, against the force of the spring 39, is drawn away from the valve disc 28, with the latter placing itself against the outer sealing seat 30 to release the inner sealing seat 34 so that, exactly as in the case of an actuation through the pedal rod 25, air flows into the booster chamber 15 to force the booster wall toward the master cylinder. A pressure will develop in the brake circuits suitable for employment in the traction slip control of the driven wheels. First, the blocking valves in the brake conduits leading to the non-driven wheels will be locked to thereby preclude a brake torque from being developed in these brakes.

By activating the first electromagnet 37 and the second electromagnet 40, and the blocking valves 22 in the brake conduits leading to the driven wheels, the brake torque for the driven wheels can be so modulated that the driving torque acting upon the wheels is reduced to such an extent that it harmonizes with the friction between tire and road, thereby preventing the wheels from racing.

As shown in the preferred embodiments, through applying a control force to the valve body 33, it is possible for the brake valve of the vacuum brake force booster to be activated irrespective of the pedal force, thereby modulating the pressure in the brake circuits. Accordingly, there advantageously is no need for the provision of any additional externally disposed valves.

What is claimed is:

1. A vacuum brake force booster in combination with an automotive hydraulic brake system including a plurality of wheel cylinders for operating individual wheel brakes, a manually operable brake pedal able to be position in a rest position or an advanced position, means for applying hydraulic pressure to said wheel cylinders by advance of said brake pedal from said rest position including an axially movable push rod, said vacuum booster including a housing, a movable booster wall subdividing said housing into vacuum and booster chambers, said vacuum chamber connected to a vacuum source, means drivingly connecting said push rod and movable wall to enable a boosting force to be applied thereto;

valve means having alternate conditions, in a first condition placing said vacuum and booster chambers in communication with each other to deactivate said booster, or in a second condition discontinuing said communication and venting said booster chamber to atmosphere to activate said booster, said valve means including a valve body having actuating and deactivating positions corresponding to said valve means alternate first and second conditions respectively;

mounting means mounting said valve body to be drivingly connected to said brake pedal to be moved therewith between said deactivating position and said actuating position as said brake pedal is moved between said rest position and said advanced position, said mounting means including a pedal piston connected to move with said brake pedal and normally move with said valve body and said mounting means also including means allowing relative movement between said pedal piston and said valve body upon application of a predetermined force to said valve body to shift said valve body relative said pedal piston and said brake pedal, and operator means for controllably applying said predetermined force to said valve body to shift said valve body and change said valve condition from that caused by said brake pedal movement and enable control of said valve means independently from said brake pedal movement.

2. A vacuum brake force booster according to claim 1, wherein said valve body is mounted concentrically to said pedal piston.

3. A vacuum brake force booster according to claim 1, wherein said mounting means for said valve body includes a first spring supported on said pedal piston holding said valve body against a stop on said pedal piston with a spring force generated thereby, and wherein said first operator means includes a first electromagnet arranged so as when energized to act to move said valve body against said force of said first spring towards deactivating position.

4. A vacuum brake force booster according to claim 3, wherein said electromagnet is concentrically disposed on said pedal piston.

5. A vacuum brake force booster according to claim 1 wherein said mounting means includes means allowing said valve body to be relatively shiftable on said pedal piston from said actuating position to said deactivating position with said pedal piston and brake pedal advanced from said rest position, and wherein said predetermined force applied by said operator means is controllably applied to shift said valve body from said actuating to said deactivating position, whereby said booster is thereby controllably deactivated despite the advanced position of said brake pedal.

6. A vacuum brake force booster according to claim 5 wherein said mounting means also includes means allowing said valve body to be relatively shiftable on said pedal piston from said deactivating position to said actuating position with said pedal in said rest position and wherein said operator means also includes a second means applying said predetermined force to also shift said valve body from said deactivating position to said actuating position, whereby said booster can be controllably actuated notwithstanding the brake pedal being in said rest position or deactivated notwithstanding said brake pedal being in said advanced position.

7. A vacuum brake force booster according to claim 6, wherein said mounting means mounting said valve body includes a first spring and a second spring located on either side of said valve body, with said first and second springs being supported on said pedal piston to act in opposition to each other, and wherein said operator means includes a first electromagnet when energized acting against the force of said first spring, and also includes a second electromagnet when energized acting against the force of said second spring.

8. A vacuum brake force booster according to claim 1 wherein said mounting means includes means allowing said valve body to be shiftable on said pedal piston from said deactivating position to said actuating position with said brake pedal in said rest position and wherein said predetermined force applied by said operator means is controllably applied to shift said valve body from said deactivating position to said actuating position, whereby said booster is thereby activated notwithstanding said brake pedal being in said rest position.

* * * * *